March 26, 1935.　　　R. WOLFE　　　1,995,442
ARTIFICIAL FOOT
Filed May 18, 1934　　　2 Sheets-Sheet 1
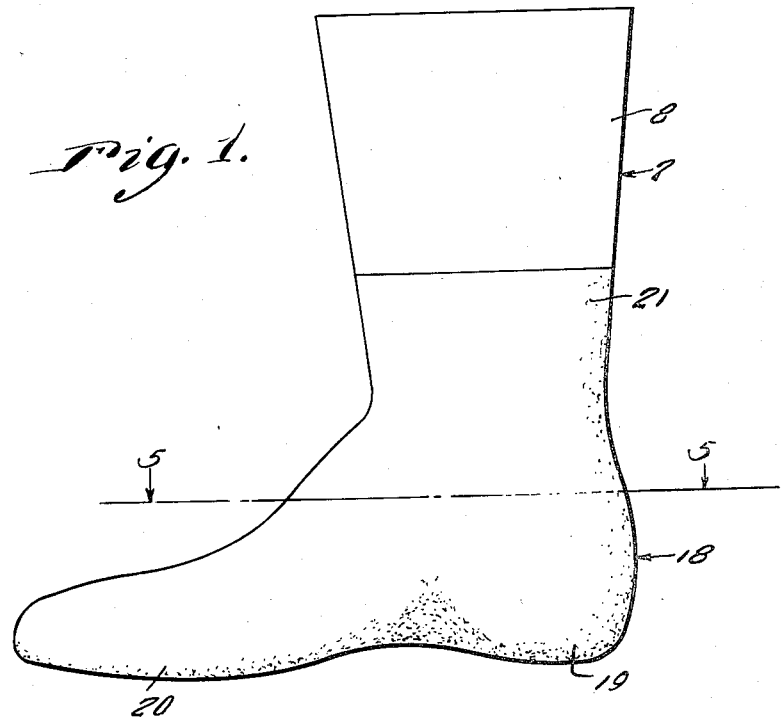
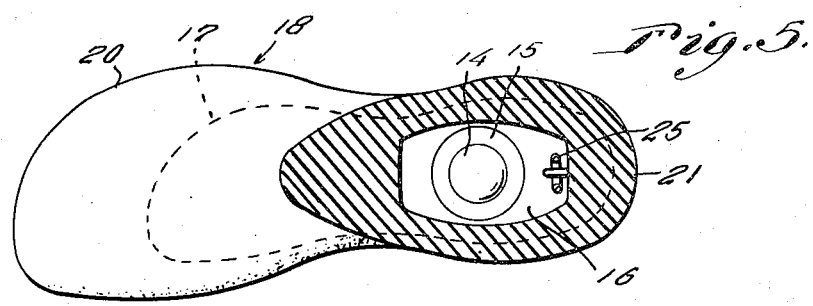
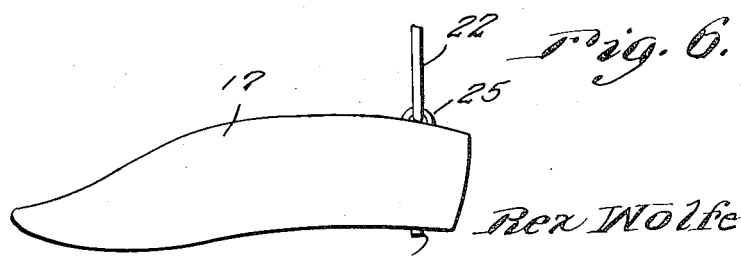
Inventor
Rex Wolfe
By Clarence A. O'Brien
Attorney March 26, 1935. R. WOLFE 1,995,442
ARTIFICIAL FOOT
Filed May 18, 1934 2 Sheets-Sheet 2

Inventor
Rex Wolfe
By Clarence A. O'Brien
Attorney

Patented Mar. 26, 1935

1,995,442

UNITED STATES PATENT OFFICE 1,995,442

ARTIFICIAL FOOT

Rex Wolfe, Midvale, Ohio

Application May 18, 1934, Serial No. 726,410

1 Claim. (Cl. 3—6)

This invention relates to an improved artificial foot expressly constructed and proposed for use by a human being, and it has reference to a structure characterized by appreciable structural distinctions and refinements not known to have been incorporated in similar devices previously patented or marketed.

My primary aim is to generally improve upon known structures in this classification by offering for use a structure embodying a careful selection and coordination of mechanical details possessing requisite resourcefulness and dependability in keeping with the needs of the prospective purchaser and the trade in general.

Stated otherwise I have evolved and produced a structural assemblage of parts especially adapted to fulfill the desired result in that they perform adequately and with such precision as to transcend in adaptation and importance analogous structures heretofore promoted for use.

The specific details chosen and their mechanical assembling and relationship will become more readily apparent from the following description and drawings.

In the drawings:

Figure 1 is an elevational view of a device or structure developed in accordance with the principles of the present inventive conception.

Figure 5 is a sectional view taken on the plane of the horizontal line 5—5 of Figure 1.

Figure 6 is a detail elevational view of a core or filler block constituting a stabilizer for the foot per se.

Figure 2:
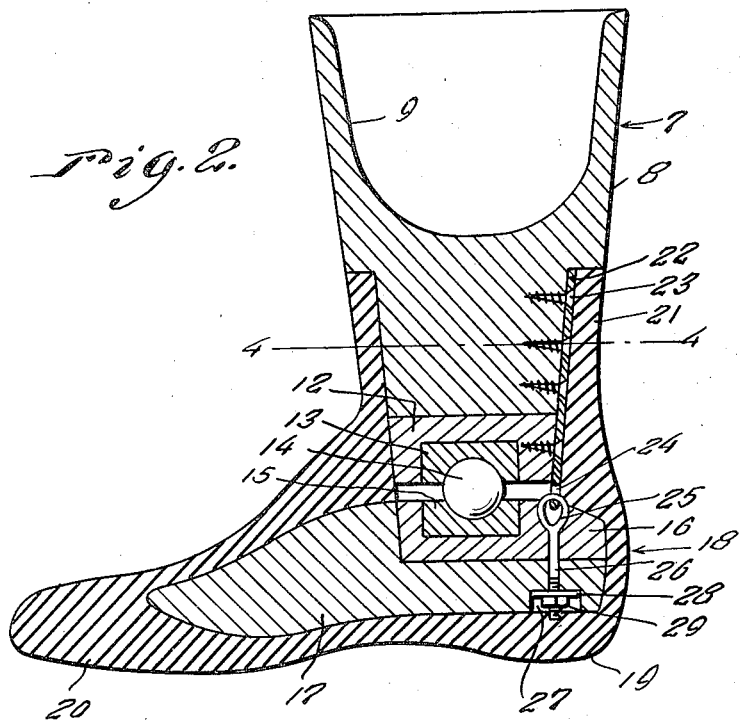
Figure 2 is a vertical sectional view of the arrangement depicted in Figure 1.
Figure 4:
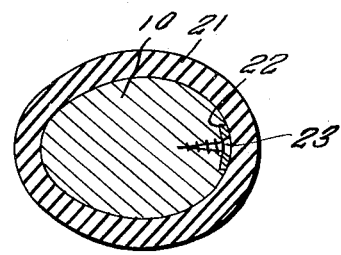
Figure 4 is a horizontal section on the plane of the line 4—4 of Figure 2.
Figure 3:
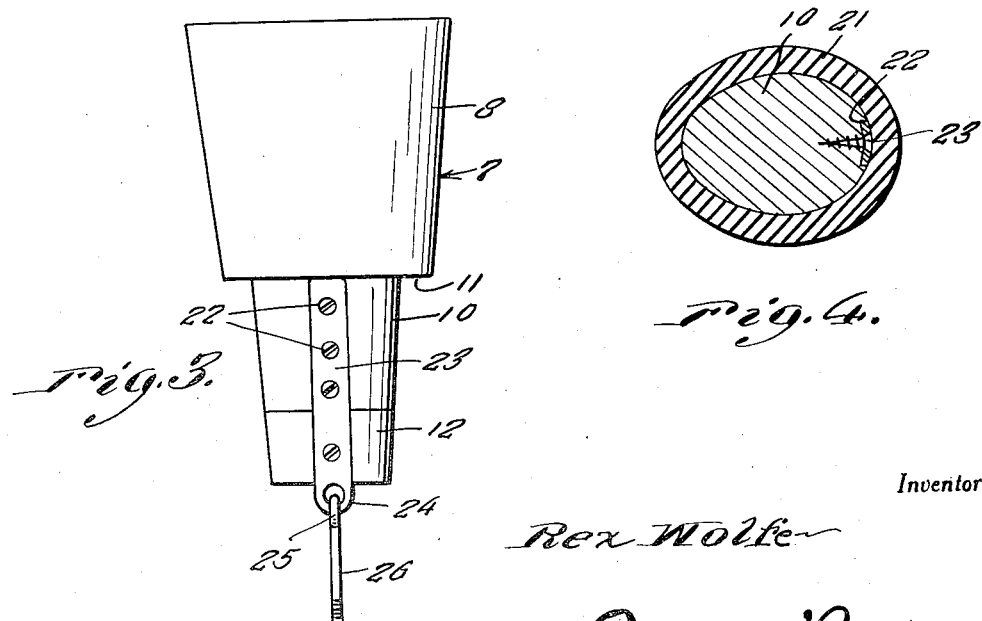
Figure 3 is a detail elevational view of the socketed adapter means constituting a salient part or feature of the invention.

I first call attention to Figure 3 wherein it will be observed that the numeral 7 designates what may be conveniently differentiated as an adapter unit. This is made of relatively soft wood such as willow and is of appropriate proportions, dimensions and weight. The upper tapered portion which constitutes the body, is denoted by the numeral 8 and is formed with a cavity or socket 9 to accommodate the amputated portion of the limb which it is adapted to receive. The lower shank portion 10 is tapered and reduced to define a shoulder 11. Suitably secured to the lower end of this extension or shank is a hard wood block 12 which is centrally recessed to accommodate a composition fitting 13 of the type shown in Figure 2. This fitting is in a sense a thrust member or bearing for the ball 14. There is a companion fitting or thrust element indicated at 15 which is in alinement with the first named fitting 13 and these together constitute a holder for the ball 14 and provide a requisite ball joint between the relatively movable parts of the complete structure. Incidentally the thrust element 15 is mounted in a hard wood insert or mounting 16 forming an integral part of the foot stabilizing wood core or filler 17. The foot, as a unit, is denoted by the numeral 18 and is constructed of rubber of requisite elastic property. The foot 18 embodies a heel portion 19 and a toe portion 20 of required pliability. In addition it includes an upstanding collar portion 21 which may be described as an anklet and which is adapted to surround the shank 10 as well as the hard wood mountings 12 and 16 and serves to provide the desired flexible joint between the foot and adapter intended to compensate for the desired foot movement or activity.

Stated otherwise the reinforcing or stabilizing core 17 is mounted in the hollow rubber foot 18 and the anklet portion of this is attached to the shank of the adapter 7 with the bearing means interposed between the shank and core 17 to provide a ball joint connection which in turn provides the requisite lateral and universal jointing motion. This insures the provision of realistic results calculated to perform appropriately when the user is walking.

In order to insure appropriate checking action between the foot and adapter and to more satisfactorily tie or connect the parts together I have utilized flexible connecting means. This embodies a metal strap or plate 22 secured by screws or fasteners 23 to the shank 10 and its associated mounting block 12. As shown in Figure 3 the lower end of the strap projecting beyond the block 12 is formed with an eye 24 secured to an eye 25 on the eye-bolt 26. The eye bolt extends down through a passage in the parts 16 and 17 and its threaded end is located in an accommodation recess 27, that is to accommodate the washers 28 and nut 29. This connecting or tie means is of course located at the heel end of the structure at which point it is most satisfactorily arranged and balanced to afford uniform equalizing results.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described my invention, what I claim as new is:

An artificial foot comprising a downwardly tapering member having a socket in its upper end and its lower end reduced, a block of material harder than the member attached to the lower end thereof and having a recess in its under face, a small block of composition material located in the recess and having a substantially semi-spherical recess in its under face, a second block of hard material having a recess in its upper face, a small block of composition material located in the recess and having a substantially semi-spherical recess in its upper face, a ball having portions fitting in the recesses of the small composition blocks, a foot core having a recess in its upper face at the rear thereof in which the lower hard block fits, a foot formed of rubber and enclosing the core and having an ankle portion fitting over the reduced lower end of the socketed member, the lower part of the ankle portion fitting over the first mentioned hard block, a strap fastened to the rear of the reduced portion of the socketed member and having an eye in its lower end extending below the first mentioned hard block, a bolt passing through the second mentioned hard block adjacent the rear end thereof through the core, the lower part of the core adjacent the rear end thereof having a recess therein in which the bolt projects, a nut on the lower end of the bolt located in the recess, the upper end of the bolt having an eye therein partly embedded in the second mentioned hard block and receiving the eye at the lower end of the strap.

REX WOLFE.